United States Patent Office 3,466,326
Patented Sept. 9, 1969

3,466,326
METHOD FOR PRODUCING ALKANEDIOIC ACID AND NITROGEN CONTAINING INTERMEDIATES FROM CYCLOALKENE
Donald R. Lachowicz, Todd S. Simmons, and Kenneth L. Kreuz, Fishkill, N.Y., assignors to Texaco Inc., New York, N.Y., a corporation of Delaware
No Drawing. Continuation-in-part of application Ser. No. 466,816, June 24, 1965. This application Mar. 10, 1966, Ser. No. 541,431
Int. Cl. C07c 51/00, 77/02
U.S. Cl. 260—537        2 Claims

ABSTRACT OF THE DISCLOSURE

Method for preparing cycloalkylnitroperoxy nitrate, nitrocycloalkanone and alkanedioic acids from cycloalkane compounds comprising contacting a cycloalkane with a mixture of dinitrogen tetroxide and oxygen to form the nitrate intermediate, contacting the nitrate intermediate with a denitrating agent to form the nitrocycloalkanone intermediate and acidifying the nitrocycloalkanone intermediate under aqueous conditions to form the alkanedioic acid.

---

This is a continuation-in-part application of Ser. No. 466,816 filed June 24, 1965.

This invention relates to a combination method for the production of alkanedioic acids from cycloalkene. Further, it pertains to subcombination methods of converting cycloalkene into the corresponding nitroperoxy (nitrocycloalkylperoxy nitrate) and nitrocycloalkanone compounds. The invention is still further directed to the nitroperoxy products as novel compounds formed as recoverable intermediates in the combination process of the invention.

Parent application, Ser. No. 466,816, represents our discovery of a method of producing alkanoic and alkanedioic acids respectively from aliphatic alkenes and alkenoic acids together with their corresponding nitroperoxy and nitroalkanone intermediates by reacting an aliphatic olefin with a mixture of nitrogen tetroxide and oxygen to form the nitroperoxy intermediate with the subsequent treatment of the nitroperoxy intermediate with particular denitrating compounds to form the nitroalkanone intermediate which in turn can be hydrolyzed in the presence of an acid catalyst to form alkanoic and alkanedioic acids.

We have discovered, and this constitutes our invention, that broadly the method set forth in our parent application, Ser. No. 466,816, is suitable for converting cycloalkenes into nitrocycloalkylperoxy nitrates, nitrocycloalkanones and alkanedioic acids. More specifically the overall method and submethods of the invention are defined as follows.

FIRST STAGE

The first stage of the overall method of the invention comprises simultaneously contacting a cycloalkene of the general formula:

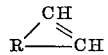

where R is a polymethylene radical of from 1 to 10 carbons or a substituted polymethylene of 2 to 10 carbons containing one or more substituents selected from the group consisting of alkyl, aryl and carboxypolymethylene, —(CH$_2$)$_n$COOH, of up to 20 carbons or more with a mixture of dinitrogen tetroxide and oxygen to form a nitroperoxy intermediate of the general formula:

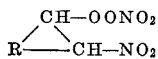

where R is as heretofore defined. Preferably R is polymethylene of from 3 to 5 carbons, most preferably 4.

The reaction temperature employed is advantageously between about −40 and 20° C. Higher reaction temperatures tend to facilitate the decomposition of the peroxynitrate product and at temperatures below the prescribed range the dinitrogen tetroxide would not function due to its inability to dissociate into monomeric nitrogen dioxide.

The reactant mole ratio of cycloalkene to oxygen to dinitrogen tetroxide in the reaction is advantageously between about 1:1:0.5 and 1:30:1.5. However, the critically important aspect of the reactant ratio is the maintenance of the mole ratio of oxygen to dinitrogen tetroxide of at least about 2:1 during the entire reactant contacting in the first stage. If the ratio of reactant oxygen to reactant dinitrogen tetroxide falls substantially below the 2:1 ratio during the reaction, a mixture of nitroalkyl nitrates and nitrites and dinitro compounds results rather than the desired nitrocycloalkylperoxy nitrate. Excess oxygen even in excess of the stated ranges does not deleteriously affect the reaction.

The reaction time is normally between about one-half and 10 hours although longer and shorter periods may be employed.

The formed nitrocycloalkylperoxy nitrate is recovered, if desired, by standard means, e.g., a fractional distillation such as stripping the volatiles from the reaction mixture below about 0° under reduced pressure.

It is to be noted that the nitrating agent, dinitrogen tetroxide, is actually an equilibrium mixture of dinitrogen tetroxide and nitrogen dioxide with the equilibrum being driven essentially to 100% dinitrogen tetroxide at 0° C. and essentially 100% nitrogen dioxide at 140° C. the term "dinitrogen tetroxide" as used herein denotes the equilibrium mixture as well as the pure N$_2$O$_4$ compound.

Under advantageous conditions, the dinitrogen tetroxide is normally introduced into the reaction system at a rate between about 0.002 and 0.02 gram/minute/gram cycloalkene. However, the actual rate depends in large measure upon the rate of heat removal from the reaction system.

The oxygen employed may be in the pure form or in the diluted form such as air or in admixture with inert gases such as nitrogen and argon. Under advantageous conditions the oxygen is introduced into the reaction system at a rate between about 5 and 40 mls./minute/gram cycloalkene.

To promote contact of the reactants in the first stage the reaction is desirably carried out under conditions of agitation in the presence of an inert liquid diluent having boiling points between about 30 and 100° C. such as n-hexane, n-heptane, carbon tetrachloride and diethyl ether.

The contact of the nitrogen dioxide and oxygen with the cycloalkene is accomplished by standard means such as combining streams of oxygen and gaseous dinitrogen tetroxide, or by passing a stream of oxygen over a through liquid dinitrogen tetroxide at a temperature between about 0 and 21° C. to form a mixture of dinitrogen tetroxide and oxygen which in turn is bubbled through or otherwise contacted with the cycloalkene. Another means of introducing oxygen and dinitrogen tetroxide is the simultaneous introduction of separate streams of the dinitrogen tetroxide and oxygen into the cycloalkene keeping in mind that the ratio of oxygen to dinitrogen tetroxide in the reaction zone should be maintained at at least about 2:1.

The formed peroxynitrate can be isolated from the diluent (if used) and excess dinitrogen tetroxide and volatile by-products by standard means such as vacuum distillation.

Examples of the cycloalkenes contemplated herein are cyclopentene, cyclohexene, cycloheptene, 3-methyl cyclopentene, 4-methyl cyclohexene, 4-phenyl cyclohexene, 3-carboxytetramethylene cyclohexene.

Examples of the intermediate nitrocycloalkylperoxy nitrate products contemplated herein are 2-nitrocyclohexylperoxy nitrate, 2-nitrocyclopentylperoxy nitrate, 2-nitrocycloheptylperoxy nitrate, 2 nitro-4-methyl cyclohexylperovy nitrate, 2-nitro-3-methyl cyclopentylperoxy nitrate, 2-nitro-4-phenyl cyclohexylperoxy nitrate and 2-nitro-3-carboxytetramethylene cyclohexylperoxy nitrate.

SECOND STAGE

In the second stage of the overall method the nitrocycloalkylperoxy nitrate formed in the first stage of the formula:

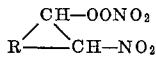

where R is as heretofore defined, is then contacted with a denitrating agent such as those selected from the group consisting of

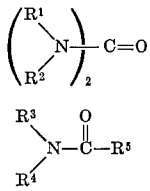

and

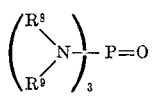

where $R^1$, $R^2$, $R^6$, $R^7$, $R^8$ and $R^9$ are alkyl of from 1 to 5 carbons and $R^3$, $R^4$ and $R^5$ are hydrogen or alkyl of from 1 to 5 carbons. The reactant contacting is conducted preferably with agitation, at a temperature between about −60 and 70° C. in a mole ratio of denitrating agent to peroxy compound of at least about 1:1, preferably less than about 20:1, to form the nitroalkanone of the formula:

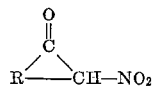

where R is as heretofore defined. The reaction of the second stage is more or less instantaneous after addition of reactants. The particular mode of bringing the reactants together depends on many things such as molecular weight of reactants and reactivity of peroxy materials. Normally, the contacting is accomplished by slow addition of the more reactive peroxy intermediate to the denitrating agent for best temperature control.

The nitrocycloalkanone intermediate product can be recovered by standard recovery processes, for example, via forming derivatives, filtration, extraction or fractional distillation and combinations thereof.

Normally, inert diluent is not employed in the second stage of the overall process of the invention if one of the reactants is in liquid form. However, if both reactants are in the solid state then to facilitate interaction inert liquid diluent is employed, for example, inert liquid diluent having a boiling point between about 30 and 100° C. such as pentane, hexane, carbon tetrachloride and diethyl ether. Agitation of the reaction mixture is also a perferred condition.

Specific examples of the denitrating agents contemplated herein are dimethyl formamide, diethyl formamide, dimethyl acetamide, dimethyl sulfoxide, diethyl sulfoxide, tetramethylurea, tetraethylurea and hexamethylenephosphoramide.

Specific examples of the nitrocycloalkanone products in the second stage of the overall process are 2-nitrocyclohexanone, 2-nitrocyclopentanone, 2-nitrocycloheptanone, 2-nitro-3-methyl cyclopentanone, 2-nitro-4-phenyl cyclohexanone, 2-nitro-3-carboxytetramethylene cyclohexane.

THIRD STAGE

In the third stage of the overall method the nitroketone of the formula:

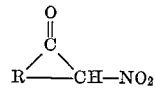

where R is as heretofore defined, recovered from the second stage is contacted with water in the presence of an acid member selected from the group consisting of mineral acid, hydrocarbon sulfonic acid and haloacetic acid having a dissociation constant in excess of $10^{-2}$ at a temperature between about 0 and 150° C., advantageously in a mole ratio of nitrocycloalkanone to acid member of at least about 1:1 and up to 1:10 and higher, in a mole ratio of nitrocycloalkanone to water of at least about 1:2 and up to 1:20 and higher to form a carboxylic acid of the general formula:

where R is as heretofore defined.

This third stage of the reaction is normally conducted for a period in the range of 15 minutes to several hours. However, the actual reaction time will be dependent in large measure on the particular acid strength of the acid member employed. Under preferred conditions, the reaction mixture is agitated in order to facilitate contact between the reactants. Further, if both the acid and the nitrocycloalkanone are of a solid nature in order to afford better reactant contact inert liquid diluent is advantageously employed. For example, inert liquid diluent having a boiling point between about 50 and 150° C., such as acetic acid.

The water contact in the third stage is normally accomplished by first forming the final nitrocycloalkanone acid reaction mixture and then contacting with an excess of water, e.g., pouring said reaction mixture into a stoichiometric excess of water maintained at a temperature of about 0° C.

The carboxylic acid product is then recovered by standard means such as by filtration and/or extracting the formed carboxylic acid with ether followed by stripping off the extractant from the extract solution to leave the carboxylic acid as residue. Examples of the final carboxylic acid products contemplated herein are adipic acid, glutaric acid, pimelic acid, 2-methyl pentanedioic acid, 3-methyl hexanedioic acid, 3-phenyl hexanedioic acid and 3-carboxy tetramethylene hexanedioic acid.

Specific examples of the acid catalyst contemplated in stage three are sulfuric acid, phosphoric acid, nitric acid, trichloroacetic acid, and the lower alkane sulfonic acids such as methane sulfonic acid and ethane sulfonic acid. The acids employed are advantageously of an acid strength in respect to aqueous dilution of at least about 70 wt. percent of the concentrated state.

The combination processes and subcombination processes (Stages I, II, III) of the invention may be further defined by the following equations utilizing cyclohexane, tetramethylurea and sulfuric acid as the example reactants:

I.

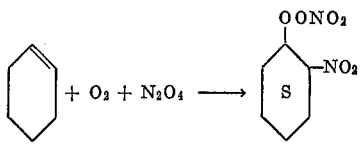

II.

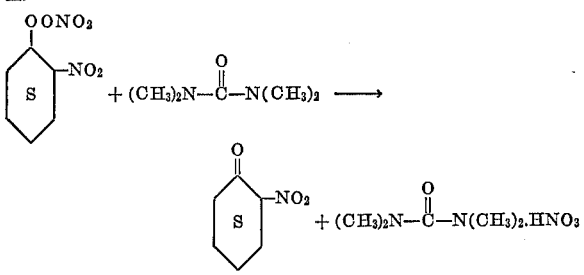

III.

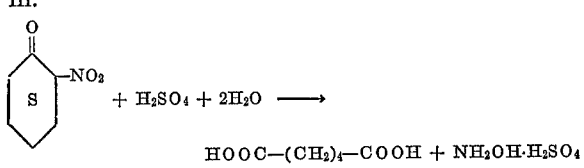

HOOC—(CH₂)₄—COOH + NH₂OH·H₂SO₄

Hereinafter and hereinbefore superatmospheric and subatmospheric pressures are contemplated whenever they are required to insure desired liquidity and separation. Further, the term "polymethylene" is intended to include methylene as well as a plurality of methylene groups.

The following examples further illustrate the overall method and submethods of the invention but are not to be construed as limitations thereof:

Example I

This example illustrates the first stage of the overall method.

To a magnetically stirred flask maintained at 0° C. in an ice bath there was charged 3.8 mls. of cyclohexene and 60 mls. of carbon tetrachloride. Through the charged cyclohexene-carbon tetrachloride mixture there was bubbled a stream of a mixture of dinitrogen tetroxide and oxygen in a mole ratio of about 1:14 at a rate of 56.5 mls./minute, said stream formed by passing a stream of oxygen over dinitrogen tetroxide at a rate of 56.5 mls./minute. This introduction lasted for a 6 hour period. A total of 2.4 mls. of dinitrogen tetroxide was added. At the end of the dinitrogen tetroxide-oxygen treating period, the carbon tetrachloride and excess nitrating agent was removed via vacuum at 0° C. under 18 mm. Hg. The residue was an almost colorless oil and was determined by infrared analysis to be 2-nitrocyclohexylperoxy nitrate.

Example II

This example illustrates the second stage of the overall method, namely, the conversion of the peroxy nitrate compound of Example I into the corresponding nitrocyclohexanone.

To a magnetically stirred flask there was added 20 mls. of tetramethylurea. To the flask there was then added dropwise all of the peroxy nitrate product produced in Example I maintaining the temperature between about 20 and 25° C. by control of the addition rate and the use of an ice bath. The reaction solution turned yellow and was very exothermic during the addition. When addition was complete the formed nitroketone in the resultant reaction solution was isolated therefrom in purified form by first diluting the resultant solution with 50 mls. of ether followed by the addition of sodium bicarbonate to the ether solution until a visual (CO₂ emission) reaction ceased to take place, i.e., until all the nitric acid by-product was destroyed. The nitroketone was then precipitated from the neutralized ether solution as its orange morpholine salt in an amount of 5.5 grams by the addition of morpholine to said solution with stirring in an amount of 3.5 mls. The precipitated morpholine salt was separated from the ether solution and the nitroketone was regenerated from said salt by dissolving said salt with dilute aqueous hydrochloric acid and extracting the nitroketone with ether, evaporating off the ether to give 2.10 grams of a yellow oil product which was identified by infrared spectrum analysis as 2-nitrocyclohexanone.

Example III

This example illustrates the third stage of the overall method of the invention, namely, the conversion of the nitrocycloalkanone product of Example II into the corresponding alkanedioic acid.

To 10 mls. of concentrated sulfuric acid at 20° C. there was added 0.78 gram of 2-nitrocyclohexanone formed in Example II. The resultant acid solution was stirred ½ hour at 20° C. and was then poured on ice and continuously extracted with ether for 5 hours. The ether was distilled from the ether extract solution leaving 0.23 gram of a white residue having a melting point of 140–146° C. The aqueous mixture was again continuously extracted with ether for 24 hours. The ether was distilled from the second ether extraction leaving a white residue having a melting point of 146–149° C. weighing 0.38 g. Infrared analysis and melting point determined the white residues to be adipic acid in a total yield of 75.9 wt. percent.

We claim:
1. A method of preparing alkanedioic acid of the formula:

HOOC—R—COOH where R is polymethylene of from 1 to 10 carbons comprising:
(a) simultaneously contacting cycloalkene of the formula:

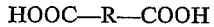

where R is as heretofore defined, with dinitrogen tetroxide and oxygen at a temperature between about −40 and 20° C. while continuously maintaining the mole ratio of said cycloalkene to said oxygen to said dinitrogen tetroxide of between about 1:1:0.5 and 1:30:1.5 during said contacting to form a peroxy nitrate compound of the formula:

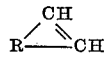

where R is as heretofore defined,
(b) contacting said peroxy nitrate compound with a denitrating agent at a temperature between about −60 and 70° C. in a mole ratio of said denitrating agent to said peroxy nitrate compound of between about 1:1 and 20:1 to form a nitrocycloalkanone of the formula:

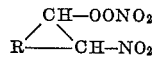

where R is as heretofore defined, said denitrating agent selected from the group consisting of

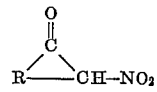

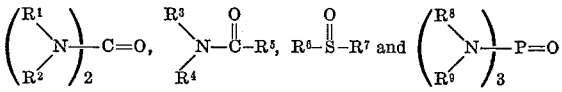

where R¹, R², R⁶, R⁷, R⁸ and R⁹ are alkyl of from 1 to 5 carbons and where R³, R⁴, and R⁵ are hydrogen or alkyl of from 1 to 5 carbons,
(c) subsequently contacting said nitrocycloalkanone at a temperature between about 0 and 150° C. with water in the presence of an acid member selected from the group consisting of mineral acid, lower alkane sulfonic acid and haloacetic acid having a dissociation content in excess of $10^{-2}$ in a mole ratio of said nitrocycloalkanone to said acid member of between about 1:1 and 1:10 and in a mole ratio of water to said nitrocycloalkanone of between about 2:1 and 20:1.

2. A method in accordance with claim 1 wherein said alkanedioic acid is adipic acid, said cycloalkene is cyclohexene, said peroxy nitrate compound is 2-nitrocyclohexylperoxy nitrate, said denitrating agent is tetramethylurea, said nitroketone is 2-nitrocyclohexanone, said acid member is concentrated sulfuric acid and the cycloalkene-oxygen-dinitrogen tetroxide contact in step (a) is conducted in the presence of carbon tetrachloride diluent.

References Cited

UNITED STATES PATENTS

| 3,095,442 | 6/1963 | Arthur | 260—466 |
| 3,301,891 | 1/1967 | Schickh | 260—466 |
| 2,621,205 | 12/1952 | Doumani et al. | 260—466 |

OTHER REFERENCES

Baryshnikova et al., Chem. Abstr. 48: 10629d (1953).
Pivawer, Dissertation Abstracts 26, 1351–2 (1965).

LORRAINE A. WEINBERGER, Primary Examiner

D. STENZEL, Assistant Examiner

U.S. Cl. X.R.

260—453, 466, 515, 533, 586

PO-1050
(5/69)

UNITED STATES PATENT OFFICE
CERTIFICATE OF CORRECTION

Patent No. 3,466,326      Dated September 9, 1969

Inventor(s) Donald R. Lachowicz, Todd S. Simmons and Kenneth L. K

It is certified that error appears in the above-identified patent and that said Letters Patent are hereby corrected as shown below:

Column 3, line 15, "hexylperovy" should read --hexylperoxy--. Column 3, line 37, following the formula:

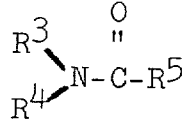

insert the formula:

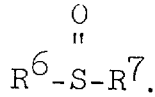

SIGNED AND
SEALED
MAY 5 1970

(SEAL)
Attest:

Edward M. Fletcher, Jr.
Attesting Officer

WILLIAM E. SCHUYLER, JR.
Commissioner of Patents